(12) United States Patent
Diaz et al.

(10) Patent No.: US 7,577,103 B2
(45) Date of Patent: Aug. 18, 2009

(54) DYNAMIC METHODS FOR IMPROVING A WIRELESS NETWORK

(75) Inventors: Alvaro H. Diaz, Holmdel, NJ (US);
Michael J. Flanagan, Chester, NJ (US);
Luca Marinelli, Niskayuna, NY (US);
Jayanthi Srinivasan, Morristown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 512 days.

(21) Appl. No.: 11/169,915

(22) Filed: Jun. 30, 2005

(65) Prior Publication Data

US 2007/0002759 A1    Jan. 4, 2007

(51) Int. Cl.
*H04L 12/26* (2006.01)
(52) U.S. Cl. ....................................................... 370/252
(58) Field of Classification Search ................... 370/252
See application file for complete search history.

(56) References Cited

U.S. PATENT DOCUMENTS

| 6,611,500 | B1 | 8/2003 | Clarkson et al. |
| 6,842,431 | B2 | 1/2005 | Clarkson et al. |
| 7,193,992 | B2 * | 3/2007 | Hasan Mahmoud et al. . 370/356 |
| 2004/0121773 | A1 * | 6/2004 | O'Brien ...................... 455/438 |

OTHER PUBLICATIONS

Drabeck, Lawrence M. et al. "Network Optimization Trials Of A Vendor-Independent Methodology Using the Ocelot Tool." Bell Labs Technical Journal 9(4), 49-66, 2005.
"Unleashing the CDMA advantage in WCDMA." Lucent Technologies, Aug. 2001.

* cited by examiner

*Primary Examiner*—Melvin Marcelo (57) ABSTRACT

In the method, system conditions may be monitored for at least a first time period within a periodic time interval, and network parameters for optimizing a wireless network may be determined. The determined network parameters may be implemented during a first time period within the at least one subsequent periodic time interval.

10 Claims, 4 Drawing Sheets

DYNAMIC METHODS FOR IMPROVING A WIRELESS NETWORK

BACKGROUND OF THE INVENTION

1. Field of the Invention

Example embodiments of the present invention are directed to methods for improving performance of a wireless network.

2. Description of the Conventional Art

Overall network performance of conventional wireless networks may vary based on wireless user traffic loading and/or user traffic patterns (herein after referred to as user traffic data) over different time periods. For example, within a single day, user traffic over a conventional wireless network may vary significantly from one hour to the next, which may subsequently result in a substantial variation in the overall performance of the network from hour-to-hour. Similarly, over extended periods of time, seasonal variations from month-to-month may also have an impact on the overall performance of a conventional wireless network. In each of these examples, different network parameters may be required from, for example, hour-to-hour or month-to-month to achieve a desired level of network performance (e.g., an optimum level of network performance).

Overall performance of a network for a particular set of network parameters may be characterized by a vector with two components, one representing network coverage and another representing network capacity. Network coverage may represent a likelihood of probability of service under load, and may be weighted by user traffic density. On the other hand, network capacity may be the amount of user traffic (e.g., within a cell of a wireless communications network), which may be served at a given overall target-blocking rate.

Conventionally, network parameters for the network are determined in the design phase, before the wireless network is implemented. In the design phase, network parameters may utilize design tools that model or predict network performance based on given network parameters (e.g., set by a human network operator) using statistical or other mathematical propagation models. However, the accuracy of these predictions may depend on the accuracy of the propagation models and the precision of modeling the environment, that is, for example, terrain, clutter, etc. Subsequently, inaccuracy in the modeling environment may result in inaccurate predictions in, for example, developing areas (e.g., residential and/or commercial areas). Furthermore, few of these network parameters may be adjusted after implementation, and those that may be adjusted are cost- and/or time-intensive.

SUMMARY OF THE INVENTION

An example embodiment of the present invention provides a method for improving performance in a wireless network. An example embodiment of the method may include monitoring system conditions for at least a first time period within a periodic time interval, determining network parameters, which may be utilized during a first time period within at least one subsequent periodic time interval, based on the monitored system conditions, and utilizing the determined network parameters during the first time period within the at least one subsequent periodic time interval. This may be considered an "open-loop" mode of operation as it does not require the automatic feedback of network performance information.

Another example embodiment of the present invention provides a method for improving performance in a wireless network. The method may include determining if a need for dynamic improvement of a wireless network exists, and dynamically improving network parameters, which may be used during a subsequent periodic time interval, based on system conditions monitored for at least a first time period within a previous periodic time interval. This may be considered a "closed-loop" mode of operation as it involves the automatic feedback of network performance information.

In example embodiments of the present invention, the network parameters may be implemented by a network operator.

In example embodiments of the present invention, each periodic time interval may include a plurality of time periods, and each of the plurality of time periods may be individually monitored for a plurality of iterations of the periodic time interval.

In example embodiments of the present invention, the periodic time interval may be twenty-four hours.

In example embodiments of the present invention, the time period may be at least one hour in length.

In example embodiments of the present invention, the network parameters may include at least one of attenuation, neighbor lists, inter-frequency handoff parameters, antenna parameters, radio frequency power levels, cell power level, pilot power fraction, antenna tilt, antenna beamwidth, and antenna orientation.

In example embodiments of the present invention, the system conditions may include user traffic present in at least one cell within the wireless network.

In example embodiments of the present invention, the determining step may determine network parameters for improving a capacity and/or coverage of the wireless network.

In example embodiments of the present invention, the monitoring step, the determining step, and/or the implementing step may be performed iteratively.

In example embodiments of the present invention, the first time period may encompass an entire periodic time interval, the first time period within the subsequent periodic time interval may encompass an entire subsequent periodic time interval, and each of the periodic time intervals may differ in length.

In example embodiments of the present invention, the subsequent periodic time interval may be greater in length than the periodic time interval.

In example embodiments of the present invention, the dynamically improving step may further include monitoring system conditions for at least a first time period within a periodic time interval, determining network parameters, which may be utilized during a first time period within at least one subsequent periodic time interval, based on the monitored system conditions, and utilizing the determined network parameters during the first time period within the at least one subsequent periodic time interval.

In example embodiments of the present invention, the detecting step may further include, detecting at least one of failure of a network element and addition of a network element, analyzing current system conditions, and determining if dynamic improvement (e.g., a new network configuration) is needed.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

Although the following description of the present invention is based on the Universal Mobile Telecommunications System (UMTS) network infrastructure implementing a next generation Wideband Code Division Multiple Access (W-CDMA) air interface technology, it should be noted that the example embodiments shown and described herein are meant to be illustrative only and not limiting in any way. As such, various modifications will be apparent to those skilled in the art. For example, it will be understood that the present invention finds application to any medium access control protocol with multiple modes in other spread spectrum systems such as CDMA2000 systems, other 3G systems and/or developing fourth generation (4G) wireless communication systems, etc.

Where used below, Node-B may describe equipment that provides data connectivity between a packet switched data network (PSDN) such as the Internet, and one or more mobile stations. Additionally where used below, the term user equipment (UE), may describe a remote user of wireless resources in a wireless communication network.

Figure 1:
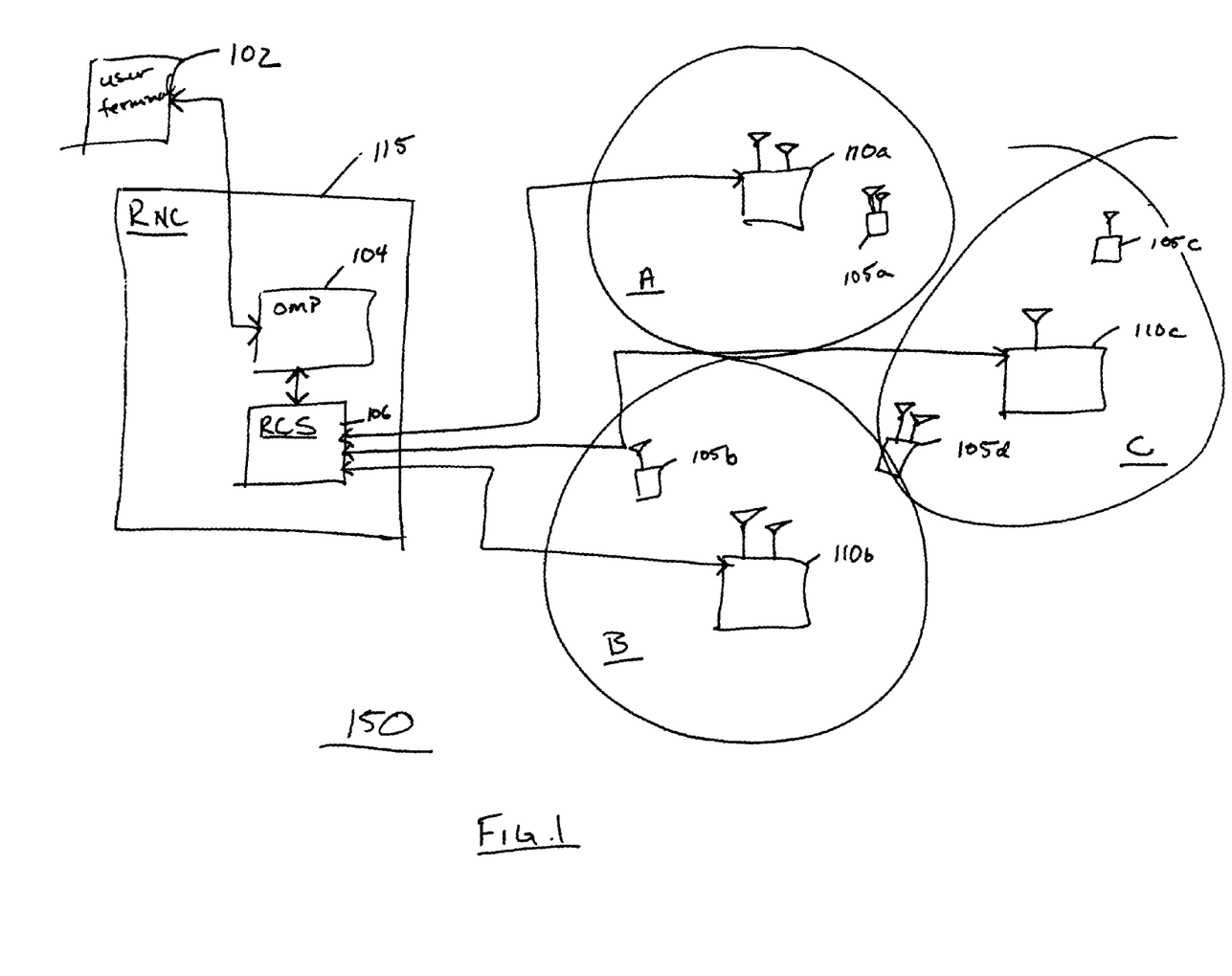
FIG. 1 illustrates an example of a prior art radio access network (RAN)

FIG. 1 illustrates a portion of prior art UMTS network, otherwise known as a UMTS radio access network (RAN). Referring to FIG. 1, the RAN 150 may include cell sites, called Node-Bs 110a, 110b, and 110c, which may serve a group of UEs, generally using a Uu interface protocol. Each Node-B 110a-110c may contain radio transceivers that communicate using Iub protocol with a radio network controller (RNC) 115. The RNC 115 within RAN 150 may communicate with other RNCs (not shown) using an Iur protocol, for example. The Iur interface is a subset of the Iu interface that enables interconnection of RNCs with each other. As shown in FIG. 1, several Node-Bs 110a-110c and the RNC 115 may be connected via links that use ATM-based packet transport, for example.

The RNC 115 may include an operations and maintenance processor (OMP) 104 and a radio cluster server (RCS) 106. In operation, the RNC 115 may perform a wide range of services within the RAN 150. For example, the RNC 115 may control operation and maintenance and/or control and manage operations of the Node-Bs 110a-110c connected thereto via the OMP 104 and the RCS 106.

Although only a single OMP 104 and RCS 106 are shown, it will be understood that the RNC 115 may include any number of OMPs and/or RCSs, for example, one for each radio cluster (or microcell). Further, although the OMP 104 and RCS 106 are illustrated as co-located within the RNC 115, it will be understood that either or both of the OMP 104 and the RCS 106 may be remotely located relative to the RNC 115.

The OMP 104 may be implemented at least in part in the form of a computer software program stored in a memory or external storage device. Such a program may be executed, for example, by a computer and/or server. In operation, the OMP 104 may provide an operation, administration, and maintenance (OA&M) platform interface to, for example, Node-Bs 110a-110c. The operation, administration, and maintenance (OA&M) platform interface may allow a network operator to more efficiently and/or more easily monitor changes in the RAN 150 via a user terminal (UT) 102. For example, the OMP 104 may allow specified parameters to be implemented into the RAN 150 wireless network dynamically for different time periods within at least one periodic time interval (e.g., hours within a day, days within a week, months/seasons within a year, etc). These network parameters may be specified by a human network operator via the UT 102 (as discussed above) or be specified using any suitable network optimization software as is well known in the art.

The OMP 104 may also detect one or more faults (e.g., component failures) within the RAN 150 and indicate these faults to a human network operator via the user terminal (UT) 102. The human network operator may then propagate changes to the RAN 150 via the UT 102 to rectify detected network fault(s).

The OMP 104 may also provide more centralized control of configuration of RAN 150 network elements (e.g., Node-Bs 110a-110c, etc.). For example, the OMP 104 may allow a network operator to propagate changes (e.g., dynamic and/or static) to network parameters (e.g., attenuation, neighbor lists, inter-frequency handoff parameters, antenna parameters radio frequency power levels, cell power level, pilot power fraction, antenna tilt, antenna beamwidth, antenna orientation, etc.) and/or monitor effects of these changes on the network via the UT 102. The OMP 104 may also allow a human network operator to define and/or collect service measurement data (e.g., user traffic data) over at least one time period (e.g., an hour, a plurality of hours, a day, a week, a month, etc.) for the wireless network. This service measurement data may then be used to identify and/or rectify existing and/or potential problems (e.g., network congestion, etc.) within the wireless network.

Referring still to FIG. 1, the RCS 106 may also be implemented at least in part in the form of a computer software program stored in a memory or external storage device. Such a program may be executed, for example, by a computer and/or server. In operation, the RCS 106 may allow the OMP 104 to interface with multiple Node-Bs, and may enable the OMP 104 to provide call processing and OA&M functionality to multiple Node-Bs, for example, simultaneously. In example embodiments of the present invention, the RCS 106 may work in conjunction with the OMP 104 to provide the above mentioned functionality to each of the Node-Bs 110a-110c within the RAN 150.

In example embodiments of the present invention, a human network operator may remotely manage a network element (e.g., a Node-B) using the UT 102 via any suitable wireless or terrestrial communication link such as the Internet, etc. For example, a human network operator may propagate changes to the network (as discussed above) by accessing the OMP 104 using a desktop or laptop computer, etc.

As discussed above, user traffic data within the RAN 150 may vary throughout different time periods (e.g., hour-to-hour, day-to-day, month-to-month, etc.) within a periodic time interval (e.g., a day, a week, a month, a season, a year, etc.). For example, during weekdays between the hours of 12 AM and 6 AM while the majority of users are asleep, the number of UEs utilizing the RAN 150 may be substantially less than the number of UEs utilizing the RAN 150 between the hours of 6 AM and 9 AM while the majority of users are commuting to work.

Figure 2:
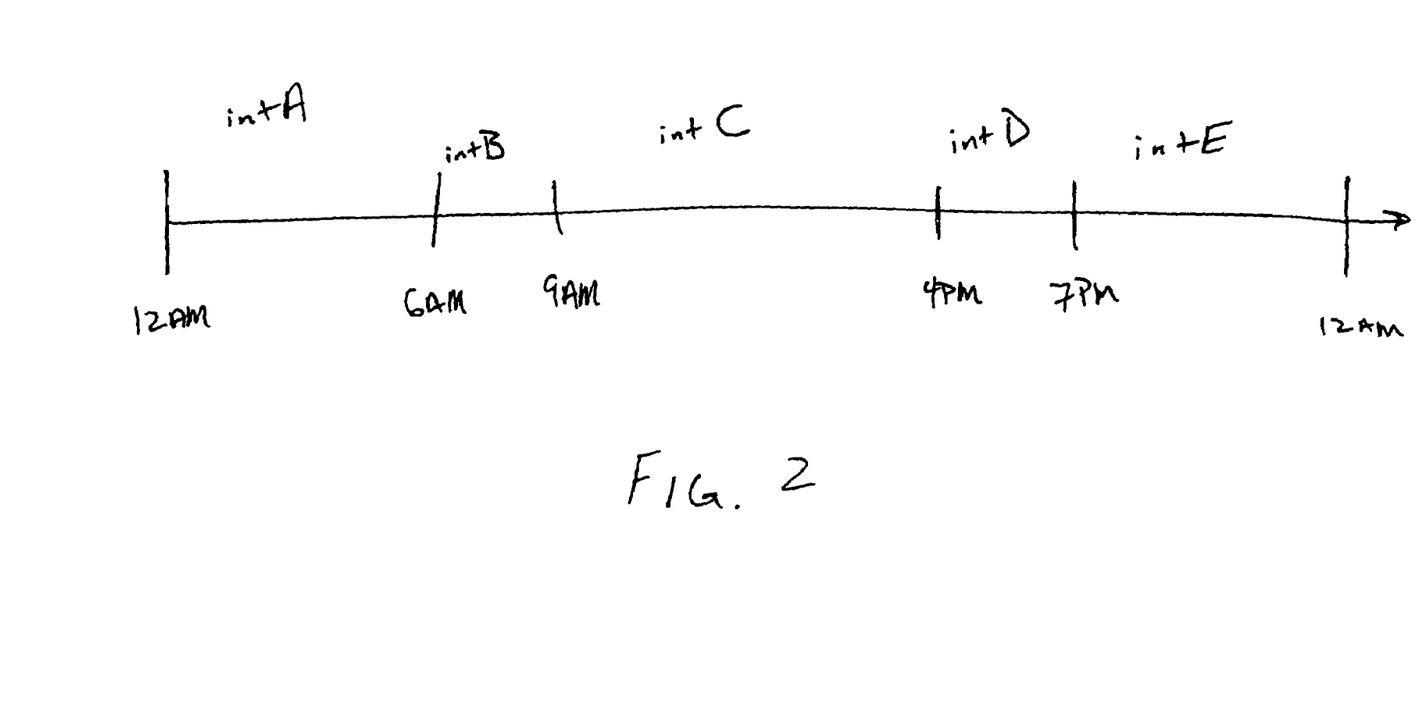
FIG. 2 is a time line illustrating an example of a periodic time interval, over which example embodiments of the present invention may be implemented.

FIG. 2 is a time line illustrating an example of a periodic time interval. As shown in FIG. 2, the periodic time interval may include five time periods, intA-intE. In one example, the periodic time interval may be 24 hours (one day). Time period intA may be six hours long from 12 AM to 6 AM. Time period intB may be three hours long from 6 AM to 9 AM. Time period intC may be seven hours long, from 9 AM to 4 PM. Time period intD may be three hours long from 4 PM to 7 PM, and time period intE may be five hours long from 7 PM to 12 AM the next day.

Figure 3:
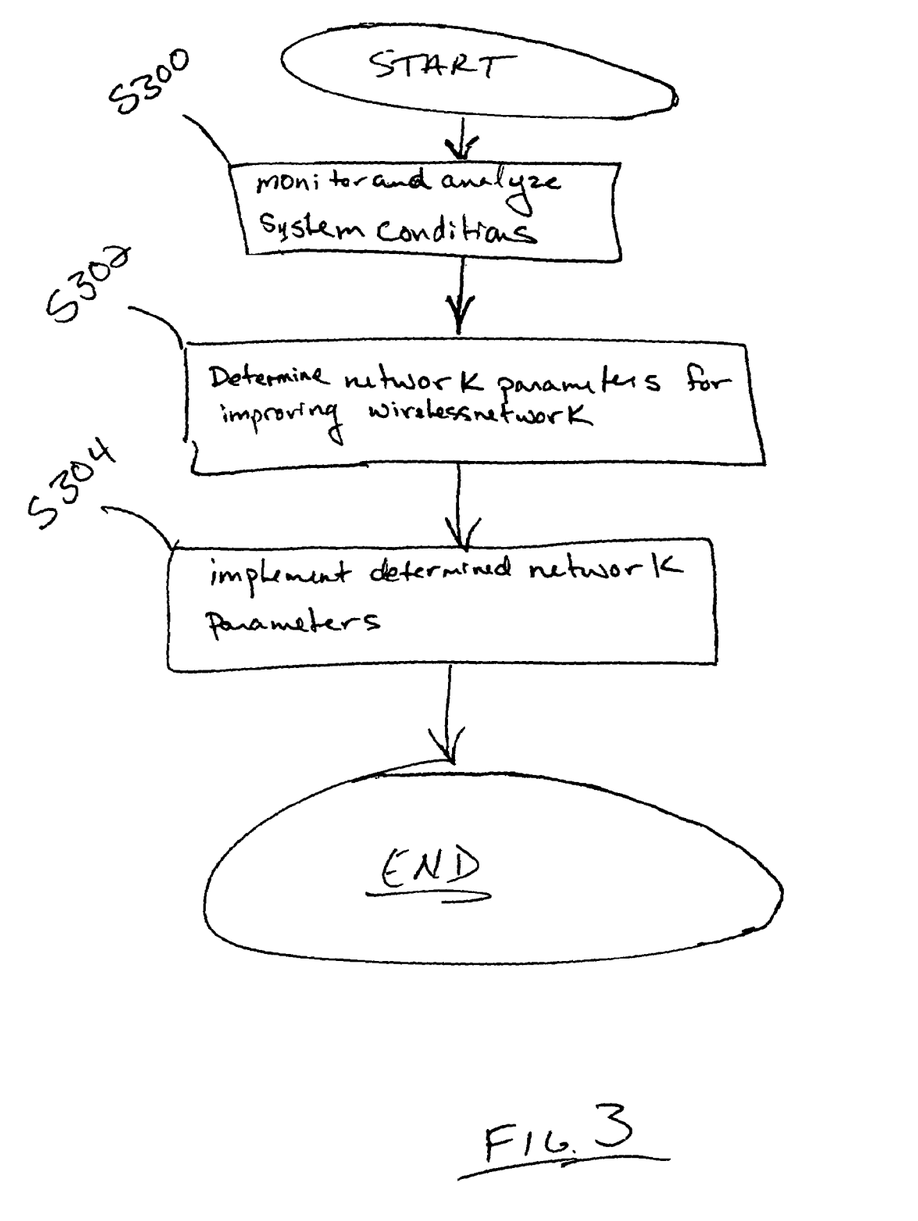
FIG. 3 illustrates a method for dynamic improvement of a wireless network, according to an example embodiment of the present invention.

Turning now to FIG. 3, FIG. 3 illustrates a method for improving performance of a wireless network, according to an example embodiment of the present invention. The method as illustrated in FIG. 3 may be performed, for example, by the OMP 104 within the RNC 115. However, hereinafter, the RNC 115, the OMP 104, and the RCS 106 will be collectively referred to as the RNC 115. For illustrative purposes, a first example embodiment of the method illustrated in FIG. 3 will be discussed with regard to the periodic time interval illustrated in FIG. 2 and the RAN 150 of FIG. 1.

As illustrated in FIG. 3, at step S300, the RNC 115 may monitor conditions for a first time period during a first periodic time interval, and subsequently analyze these monitored system conditions. For example, with regard to FIG. 2, the RNC 115 may monitor a volume of user traffic (e.g., the wireless traffic loading, user traffic density, etc.) within each of the cells A, B, C, in the UTRAN 100 during a first time period intA (between the hours of 6 AM and 12 AM) within a first periodic time interval (day one).

The RNC 115 may then analyze the monitored system conditions to determine, for example, an average load per cell, for each cell A, B, and C, for intA (between the hours of 12 AM and 6 AM) of day one. Determining of an average load per cell by analyzing monitored system conditions is well known in the art and may be performed in any suitable manner.

At S302, the RNC 115 may determine network parameters for improving the RAN 150 based on the monitored system conditions. That is, namely, the RNC 115 may determine network parameters, to be utilized during a first time period within at least one subsequent periodic time interval based on the monitored system conditions. For example, again with regard to FIG. 2, the RNC 115 may determine network parameters to be used during intA (between the hours of 6 AM and 12 AM) of a subsequent periodic time interval (day two). The network parameters may be determined, for example, based on the determined average load per cell for each cell A, B, and C. Namely, the RNC 115 may determine new network parameters, such as, attenuation, neighbor lists, inter-frequency handoff parameters, antenna parameters, radio frequency power levels, cell power level, pilot power fraction, antenna tilt, antenna beamwidth, antenna orientation, etc., that improve performance (e.g., average load per cell).

In example embodiments of the present invention, network parameters may be determined in any suitable manner, for example, by a network operator or by software implemented on a computer. An example of software usable for determining network parameters is the Ocelot® Tool developed by Lucent Technologies, Incorporated. However, it will be understood that any suitable software may be used.

Returning to FIG. 3, at step S304, the RNC 115 may implement the network parameters, determined based on system conditions present during intA (between the hours of 6 AM and 12 AM) of day one, for use during intA (between the hours of 6 AM and 12 AM) of day two. That is, namely, the determined network parameters may then be utilized during the first time period (intA) within the at least one subsequent periodic time interval (e.g., day two, day three, day four, etc.).

Figure 4:
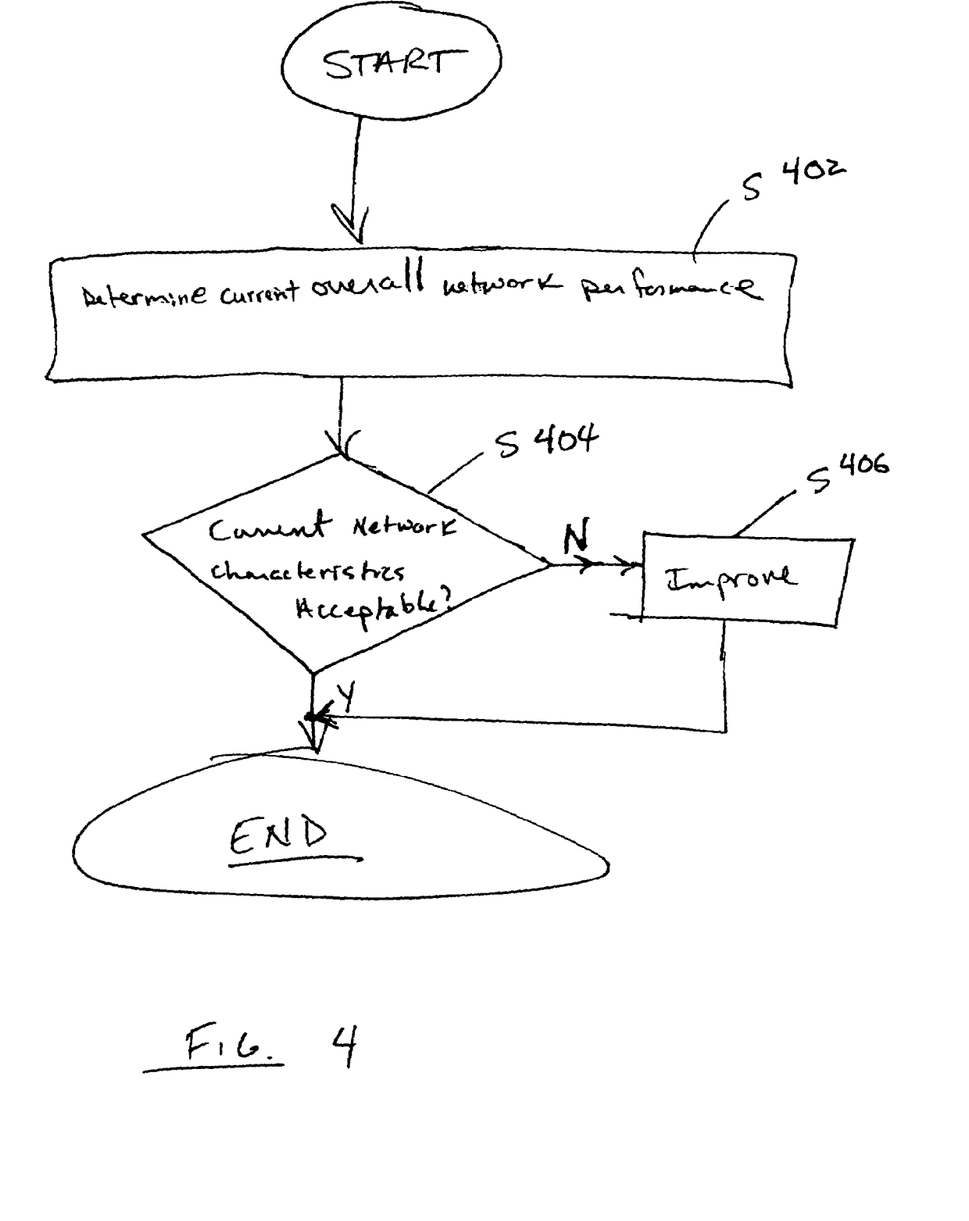
FIG. 4 illustrates a method for dynamic improvement of a wireless network, according to another example embodiment of the present invention.

FIG. 4 illustrates another method for improving a wireless communications network, according to an example embodiment of the present invention. In example embodiments of the present invention, the method as illustrated in FIG. 4 may be performed by the OMP 104 within the RNC 115. In the alternative, the method as illustrated in FIG. 4 may be performed by a human network operator, in a manner similar to that as described above. However, as discussed above, the RNC 115, the OMP 104, and the RCS 106 will be referred to collectively as the RNC 115.

In operation, the RNC 115 may determine a need for dynamic improvement, for example, in response to observed changes within a wireless network (e.g., the RAN 150 of FIG. 1). Similar to that as discussed above, a need for improvement may be determined in any suitable manner, for example, by software implemented on a computer. An example of software usable for determining a need for improvement is the Ocelot® Tool developed by Lucent Technologies, Incorporated. However, it will be understood that any suitable software may be used.

In the alternative, as discussed above, a need for improvement may be determined by a human network operator. In this example, the RNC 115 may report the monitored system conditions to the human network operator, for example, via user terminal (UT) 102. The human network operator may then determine if improvement is needed based on the monitored system conditions using his/her experience and/or knowledge base.

After determining a need for dynamic improvement, the RNC 115 may configure network parameters, for example, by utilizing the method as illustrated in FIG. 4, which will be discussed in more detail below.

As discussed above, an overall performance of a wireless network may be characterized by a vector with, for example, two components, one representing network coverage and another representing network capacity. Network coverage may represent a likelihood of service under load, and may be weighted by traffic density. Network capacity may represent an amount of user traffic (e.g., within a cell), which may be served at any given time at a given overall target-blocking rate. Although only network coverage and capacity have been discussed above, overall network performance may be characterized by a vector having two or more components other than (or in addition to) network coverage and/or network capacity, including, for example, voice quality, data throughput, overall network cost, etc.

As discussed herein, observed changes may be, for example, failure of a network element (e.g., a Node-B or component thereof), addition of a new Node-B, etc.

A desired level of service, as used herein, may refer to a performance level threshold, for example, an acceptable overall network performance value of a wireless network and a range relative thereto. This desired level of service may be established at any time (e.g., in the design-phase, or after implementation), and in any suitable manner (e.g., set by a human network operator, determined by computer implemented software, etc.) as discussed above. Furthermore, methods for determining a desired level of service within a wireless network are well known in the art, and as such, will not be discussed herein any further.

Example embodiments of the present invention will be described with regard to failure of a network element. However, as discussed above, example embodiments of the present invention may be utilized in connection with any trigger for dynamic improvement of a wireless network.

As illustrated in FIG. 4, after detecting failure of a network element (e.g., a Node-B), the RNC 115 may determine a current overall performance level of the RAN 150, at step S402.

Methods for determining an overall performance of a wireless network are well known in the art and will not be described in detail herein. Examples of methods for determining overall performance of a wireless network may be found, for example, in U.S. Pat. No. 6,611,500 and/or U.S. Pat. No. 6,842,431, the entire contents of which are incorporated herein by reference. These methods may be implemented, at least in part, using software executable by a computer and/or by a human network operator.

Returning to FIG. 4, at step S404, the RNC 115 may determine if the current overall network performance is within a set range of the desired network performance level. As discussed above, the desired network performance level (and range relative thereto) may be set by a human network operator, and may be set in the design-phase. If the current overall network performance is within the set range of the desired overall network performance level, the procedure may terminate.

Returning to step S404, if the current overall network performance level is not within the set range of the desired overall network performance level, the RNC 115 may dynamically reconfigure the current network parameters, at step S406. The network parameters may be reconfigured in a manner similar to that as described above with regard to FIG. 3; however, for example, upon failure of a network element, it may be desirable to monitor system conditions over a smaller periodic time interval and subsequently smaller time periods.

For example, the periodic time interval may be two hours, and time periods may be at least a portion of an hour (e.g., one-half hour, ten minutes, etc.); however, system conditions may also be monitored over the entire periodic time interval. In this case, the system conditions may be monitored for an entire periodic time interval, and the monitored system conditions may be used to determined network parameters to be implemented for at least one subsequent periodic time interval.

In the above mentioned example, upon failure of a wireless network element, the RNC 115 may monitor traffic load on each of the remaining Node-Bs in the UTRAN 150 for a first two hours after detecting the failure of a Node-B 110a. The RNC 115 may then determine network parameters for improving the overall performance of the RAN 150 for a subsequent two hours, based on the user traffic data acquired over the entire duration of the first two hours. Returning to FIG. 4, from step S406, the procedure may terminate.

In another illustrative example, the RNC 115 may determine network parameters for improving the overall performance of the RAN 150 based on system conditions previously monitored up to the time at which the network element fails. For example, the RNC 115 may detect failure of a network element within seconds. The RNC 115 may then immediately (i.e., in a matter of minutes) determine network parameters for improving the overall performance of the RAN 150 using the remaining network equipment based on previously monitored system conditions. That is, for example, system conditions monitored over a previous time period (e.g., hour, day, week, etc.) and/or a periodic time interval (e.g., hour, day, week, month, etc.). The RNC 115 may then immediately (e.g., within seconds) implement the determined network parameters.

Although example embodiments have been described with regard to dynamic improvement of a wireless network for different hours through out one day, the skilled artisan will understand that example embodiments of the methods described herein may be implemented in conjunction with any suitable periodic time interval (e.g., hours, days, weeks, months, seasons, etc.) and any suitable time period (e.g., hours, days, weeks, months, seasons, etc.).

Furthermore, the skilled artisan will also understand that the methods, according to example embodiments of the present invention are not limited to the specific examples discussed above with regard to FIGS. 3 and/or 4. Instead, the skilled artisan will understand that "dynamic improvement" or "dynamically improving", as discussed herein, may refer to improvement, which may vary.

In contrast to the above dynamic implementation, the skilled artisan will understand that methods, according to example embodiments of the present invention, may be used in a more "static" implementation, referred to as "static improvements". These "static improvements" may refer to implementations which include the determining or configuring of network parameters, which may be implemented, for example, for at least one year. That is, "static", as used herein, may refer to the implementation of network parameters over longer and/or multiple periodic time intervals and/or time periods (e.g., 1, 2, 3, ... N years) without a recognition of time dependent changes in network parameters over the duration of the longer periodic time intervals (e.g., one year).

As mentioned above, in example embodiments of the present invention, network parameters, which may be reconfigured in accordance with example embodiments of the present invention, may include, for example, attenuation, neighbor lists, inter-frequency handoff parameters, antenna parameters, radio frequency power levels, cell power level, pilot power fraction, antenna tilt, antenna beamwidth, antenna orientation, and/or any other suitable network parameter. These parameters may be adjusted for an entire wireless communications network, or any subset of cells and/or sectors within the wireless communications network. Further, these parameters may be used to improve network coverage and/or network capacity for at least one time period within at least one time period and/or periodic time interval, as discussed above.

Example embodiments of the present invention may make maximum use of existing infrastructure during multiple time periods (e.g., hours, days, weeks, months, years, etc.) within a periodic time interval (e.g., 24 hours, a week, one or more months, seasonal, etc.), which may have substantially different traffic loads.

As discussed herein, the methods for improving network performance may be dynamic or static. For example, when performing the methods as discussed herein dynamically, the methods may be performed iteratively over shorter time periods within a shorter periodic time interval. For example, dynamic improvement may include improving network performance for each hour (or hours) throughout each day, for example, as discussed above.

Example embodiments of the present invention provide methods for improving a wireless network, including, for example, improving (e.g., optimizing) attenuation, neighbor lists, inter-frequency handoff parameters, antenna parameters, radio frequency power levels, cell power level, pilot power fraction, antenna tilt, antenna beamwidth, antenna orientation, etc.

The invention being thus described, it will be obvious that the same may be varied in many ways. Such variations are not to be regarded as a departure from the invention, and all such modifications are intended to be included within the scope of the invention.

We claim:

1. A method for improving performance in a wireless network, the method comprising:
   detecting at least one of failure of a base station and addition of a base station;
   analyzing current system conditions in response to the detected failure or addition; and
   determining if dynamic improvement is needed based on the analyzing step; and
   dynamically improving network parameters, for use during a subsequent periodic time interval, based on system conditions monitored for at least a first time period within a previous periodic time interval if the determining step determines that dynamic improvement is needed; wherein
   an overall performance of the wireless network is characterized by a vector having two components, one representing network coverage and another representing network capacity.

2. The method of claim 1, wherein the dynamically improvement step further comprises:
   monitoring system conditions for at least a first time period within a periodic time interval;
   determining network parameters, to be utilized during a first time period within at least one subsequent periodic time interval based on the monitored system conditions; and
   utilizing the determined network parameters during the first time period within the at least one subsequent periodic time interval.

3. The method of claim 1, wherein the network parameters include at least one of attenuation, neighbor lists, inter-frequency handoff parameters, and antenna parameters.

4. The method of claim 1, wherein the first time period is at least a portion of one hour.

5. The method of claim 2, wherein the network parameters include at least one of attenuation, neighbor lists, inter-frequency handoff parameters, radio frequency power levels, cell power level, pilot power fraction, antenna tilt, antenna beamwidth and antenna orientation.

6. The method of claim 1, wherein the improving step also improves at least one of voice quality, data throughput, and cost of operation, based on user traffic present in at least one cell within the wireless network.

7. The method of claim 1, wherein network coverage represents a likelihood of service under load weighted by traffic density, and network capacity represents an amount of user traffic within a cell.

8. The method of claim 7, wherein the vector further includes components representing voice quality, data throughput and overall network cost in addition to vectors representing network coverage and network capacity.

9. The method of claim 1, wherein the detecting step is performed during operation, but after a design phase and implementation of the wireless network.

10. The method of claim 1, wherein the detecting step detects at least one of complete failure of a base station and addition of a new base station.

* * * * *

UNITED STATES PATENT AND TRADEMARK OFFICE
CERTIFICATE OF CORRECTION

| | | |
|---|---|---|
| PATENT NO. | : 7,577,103 B2 | Page 1 of 1 |
| APPLICATION NO. | : 11/169915 | |
| DATED | : August 18, 2009 | |
| INVENTOR(S) | : Diaz et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 926 days.

Signed and Sealed this

Fourteenth Day of December, 2010

David J. Kappos
*Director of the United States Patent and Trademark Office*